United States Patent [19]

Crane et al.

[11] Patent Number: 5,533,097

[45] Date of Patent: Jul. 2, 1996

[54] PORTABLE COMMUNICATION SYSTEM COMPRISING A LOCAL AND WIDE AREA COMMUNICATION UNITS WHICH CAN STORE A COMMUNICATION WHEN THE WIDE AREA COMMUNICATION SYSTEM IS NOT AVAILABLE

[75] Inventors: Eric K. Crane, Wheaton; David E. Morgan, Lisle, both of Ill.; Neil Wellenstein, Phoenix, Ariz.

[73] Assignee: Motorola, Inc., Schaumburg, Ill.

[21] Appl. No.: 164,871

[22] Filed: Dec. 8, 1993

Related U.S. Application Data

[63] Continuation of Ser. No. 842,277, Feb. 26, 1992, abandoned.

[51] Int. Cl.[6] .................................................... H04Q 7/32
[52] U.S. Cl. .................... 379/58; 340/825.44; 370/95.1; 379/27; 379/57; 379/59; 379/61
[58] Field of Search .................................. 379/58, 59, 61, 379/57, 27; 340/825.44; 364/101; 370/95.1; 455/15, 17, 33.4, 51.2, 62

[56] References Cited

U.S. PATENT DOCUMENTS

| | | | |
|---|---|---|---|
| 4,056,779 | 11/1977 | Toler | 325/4 |
| 4,481,382 | 11/1984 | Villa-Real | 379/61 |
| 4,659,878 | 4/1987 | Dinkins | 379/60 |
| 4,661,972 | 4/1987 | Kai | 379/57 |
| 4,677,654 | 6/1987 | Lagin et al. | 379/58 |
| 4,680,787 | 7/1987 | Marry | 379/63 |
| 4,745,632 | 5/1988 | Duffy | 379/58 |
| 4,748,655 | 5/1988 | Thrower et al. | 379/60 |
| 4,876,710 | 10/1989 | Reed et al. | 379/63 |
| 4,906,989 | 3/1990 | Kasvgai | 340/825.44 |
| 4,972,455 | 11/1990 | Phillips et al. | 379/59 |
| 4,991,197 | 2/1991 | Morris | 379/58 |
| 5,020,090 | 5/1991 | Morris | 379/58 |
| 5,060,152 | 10/1991 | Maesev et al. | 364/401 |
| 5,065,423 | 11/1991 | Gaskill | 379/57 |
| 5,077,783 | 12/1991 | Leppärer | 379/27 |
| 5,097,499 | 3/1992 | Cosentino | 379/59 |
| 5,117,449 | 5/1992 | Metroka et al. | 379/58 |
| 5,127,042 | 6/1992 | Gillig et al. | 379/58 |
| 5,128,981 | 7/1992 | Tsukamoto et al. | 379/58 |
| 5,177,780 | 1/1993 | Kasper et al. | 379/59 |
| 5,276,686 | 1/1994 | Ito | 370/95.1 |

FOREIGN PATENT DOCUMENTS

| | | | |
|---|---|---|---|
| 0224422 | 9/1988 | Japan | 379/57 |
| 5-037618 | 2/1993 | Japan | 379/58 |

OTHER PUBLICATIONS

D. Snager, "NEC Shows Advanced Small PC," New York Times, Oct. 4, 1991.

*Primary Examiner*—Curtis Kuntz
*Assistant Examiner*—William Cumming
*Attorney, Agent, or Firm*—Steven G. Parmelee; Susan L. Lukasik

[57] ABSTRACT

A local-area RF communication unit (305) is incorporated in a portable housing, such as a briefcase (101), and adapted to communicate with personal communication devices, such as a handset (105) and notepad (107). One or more wide-area RF communication units (303) are disposed in the briefcase (101) and adapted to communicate with a wide-area communication system. The local-area RF communication unit (305) and the wide-area communication unit are selectively controlled by a microprocessor (301) within the briefcase (101).

37 Claims, 4 Drawing Sheets

PORTABLE COMMUNICATION SYSTEM COMPRISING A LOCAL AND WIDE AREA COMMUNICATION UNITS WHICH CAN STORE A COMMUNICATION WHEN THE WIDE AREA COMMUNICATION SYSTEM IS NOT AVAILABLE

This is a continuation of application Ser. No. 07/842,277, filed Feb. 26, 1992 and now abandoned.

FIELD OF THE INVENTION

This invention relates to communications systems, including but not limited to integrated personal communications systems.

BACKGROUND OF THE INVENTION

Today's professional uses many devices to maintain personal and business communications. These devices include a pager, a cellular and/or CT-2 telephone, a personal data manager, a data terminal, and a trunked and/or conventional voice/data radio. Carrying around all of these devices is heavy, cumbersome, and impractical. Each device has a separate battery charger as well. In addition, each device has its own communication protocol, and service may not be readily available in all locations for each device.

Professionals tend to bring only their pager and perhaps a cellular phone to meetings, conventions, and business trips. If the professional's cellular phone service is not available in his or her present location, standing in line at the airport or running out of business meetings to find a phone is often not practical. Having on-hand data and phone capability is very helpful to a professional on a sales trip out of town or simply down the road. A professional could retrieve a report or sales information from the computer at the office, transfer digital photographs of new prototypes, make airplane reservations, defer incoming calls, and perform a myriad of other tasks if all of the personal devices would be available to the professional in a single compact housing.

A communication system that integrates various different voice and data communications in a single portable housing is desired.

DESCRIPTION OF A PREFERRED EMBODIMENT

The following describes a method and apparatus that integrates various different voice and data communications in a portable housing. A briefcase forms the housing, encompassing a portable communications system that integrates a personal communication device (PCD) within a local-area communications system with a number of established wide-area communications systems, while only requiring a single handset for any number of wide-area communications systems. Additional hardware enables communications with a wireless notepad having data and image display similar to a personal computer.

Figure 1:
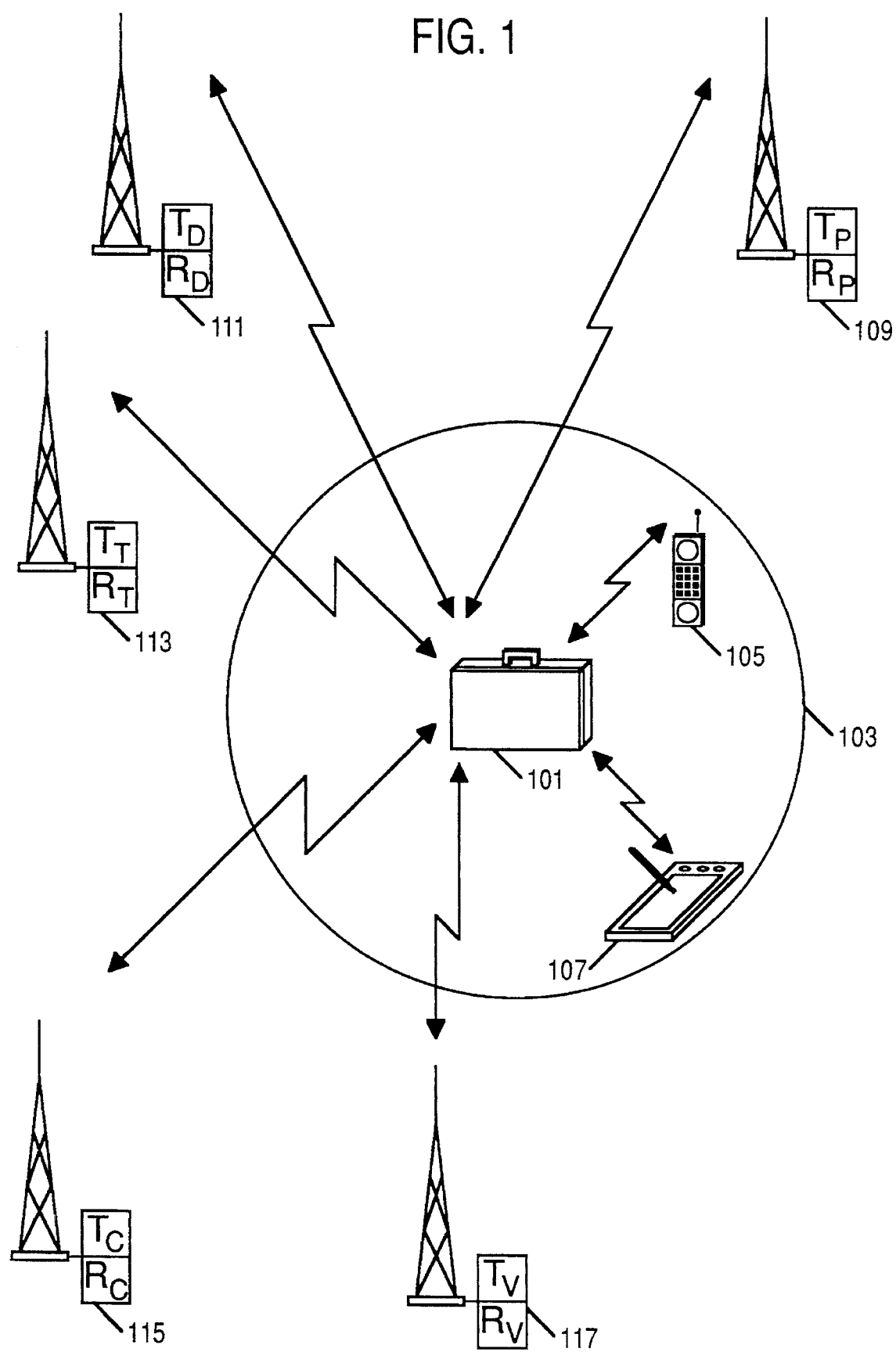
FIG. 1 is a system diagram of a wide-area communications system and a local-area communications system integrated in a briefcase housing in accordance with the invention.

A system diagram of a wide-area communications system and a local-area communications system integrated in a briefcase housing is shown in FIG. 1. A briefcase 101 has a local-area communications system including a low-power transmitter and receiver to communicate individually with PCDs within a local area 103, for example within 100 feet of the briefcase 101. The PCDs include a wireless handset 105 and a wireless notepad 107 ("notepad"). Other PCDs could include a digital camera, measurement instrument (e.g., a pressure gauge), keyboard, and a wrist-watch (or other) pager, none of which are shown. The protocol for the local-area communications system uses a protocol such as described in I.E.E.E. standard 802.3 or 802.5, two I.E.E.E. standards for local-area networks. Each PCD has its own identification code and a security identification code so that only the owner of the briefcase 101 (or designated users) is granted access to the RF systems serviced by the briefcase 101.

Also included in the briefcase 101 is a communication unit, including a transmitter and/or receiver as appropriate, for each wide-area communications system with which communications are desired. Wide-area communications systems include paging systems 109, data systems 111, dispatch trunking systems 113, cellular and/or CT-2 systems 115, and various other systems 117 including conventional voice systems, various computer services, AM/FM radio, and television. The briefcase 101 supports multiple communication protocols for multiple information formats, such as data, text, voice, audio, graphics, images, video, and telemetry, among others. The briefcase 101 also includes hardware to integrate the local-area communications system with the wide-area communications system, such that the interface between the two systems is transparent to the user.

Figure 2:
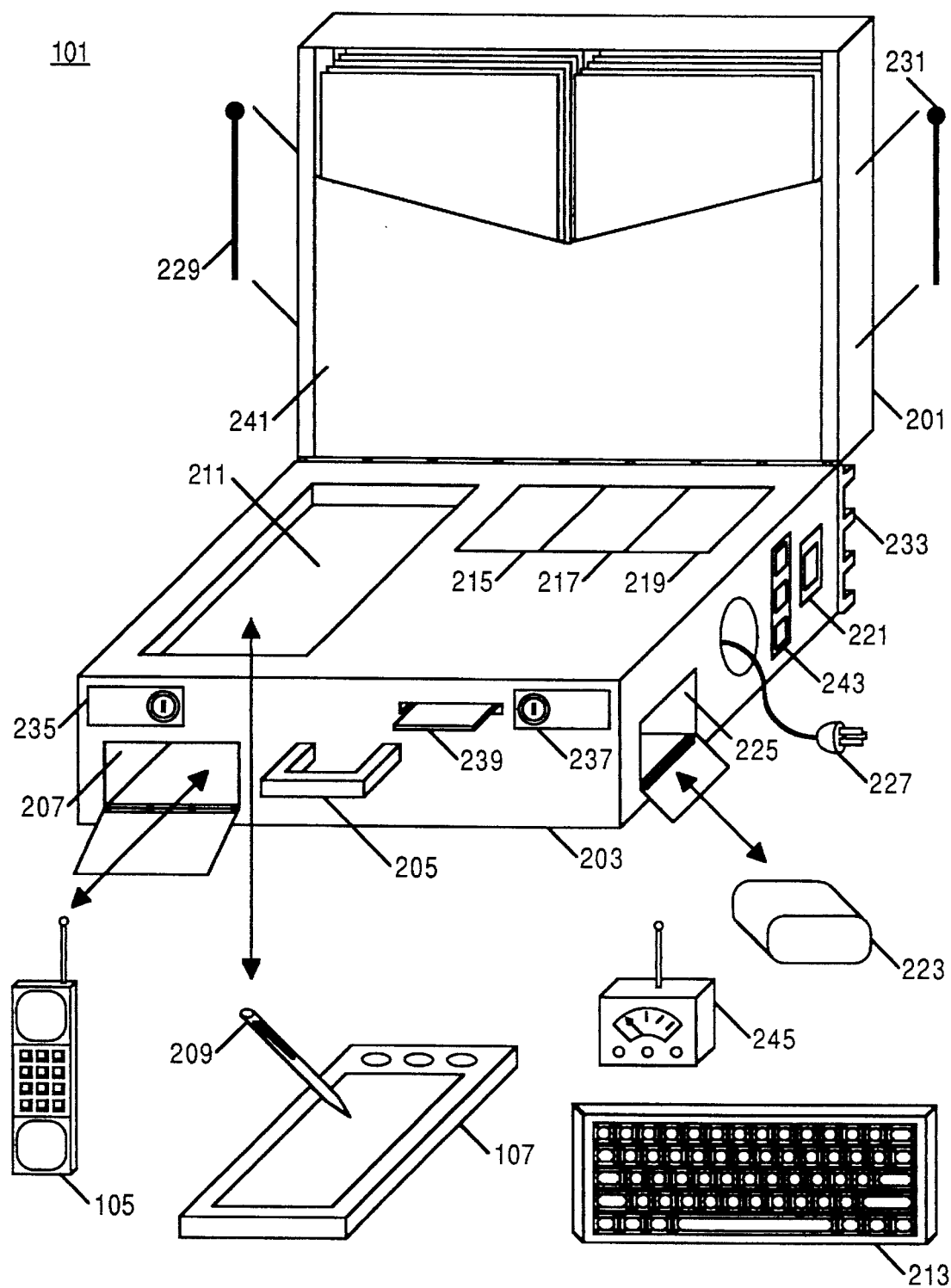
FIG. 2 shows a portable communications system with various personal communication devices in accordance with the invention.

A portable communications system with various PCDs is shown in FIG. 2. The briefcase 101 includes a storage section 201, an RF (radio frequency) section 203, and a carrying handle 205. Storage space 241 for papers, pens, pencils, the briefcase owner's manual, and other items is provided within the storage section 201. A handset 105, with RF interface to the local-area communications system in the briefcase 101, is stored in compartment 207 in the RF section 203 of the briefcase 101. The handset 105 includes a rechargeable battery and plugs into a battery charger (not shown) within compartment 207. The handset 105 provides voice and voice-related (e.g., dialing information) communications to the briefcase 101 over the RF interface to the local-area communications system. Only one handset 105 is used no matter how many wide-area communications systems are integrated.

A notepad 107, such as a 3125 Notepad PC available from NCR, is modified with an RF interface to the local-area communications system in the briefcase 101. A pen 209 provides entries to the notepad 107. The pen 209 may also contain a pager for receiving messages from the briefcase 101. The notepad 107 can retrieve data from an external computer, such as the office data base, by calling the computer through the data system 111 (See FIG. 1). Messages from (or relayed through) the briefcase 101 can be displayed on the notepad 107, with the ability to store and/or forward the messages. These incoming messages include requested information, phone messages, reminders from a personal data base or calendar, the evening news from the local television station, and so forth. Messages may be sent to the briefcase 101 from the notepad 107. These messages include instructions to place a phone call, hold all pages and phone calls, make airplane reservations, retrieve a sales report, and so forth. Sending or receiving messages is handled in a simple, user-friendly format such that the user need not refer to a manual nor memorize an endless list of commands. The notepad 107 includes a rechargeable battery and plugs into a battery charger (not shown) within compartment 211.

Other PCDs may be used with the briefcase 101. One such device is an RF keyboard 213, as is known in the art, for easy entry of long reports. A measurement instrument 245, such as a voltmeter, barometer, or temperature gauge, is modified with an RF interface to transmit measurements to the briefcase for storage or wide-area transmission. A digital camera (not shown), as is known in the art, may be modified with an RF interface to provide photographic data entry. Each PCD has an RF interface to the local-area communications system in the briefcase 101.

Both the handset 105 and the notepad 107 (as well as each PCD) have optional wireline connections 243 to the briefcase 101 in the event communications are not possible due to RF interference, RF ban, such as in an airplane, or in case the battery charge is low in the handset 105 or notepad 107. The briefcase 101 automatically uses the wireline connections when they are coupled to a PCD. The RF and wireline transceivers (not shown) for the PCDs are stored in the RF section 203 of the briefcase 101.

Enclosed in the briefcase 101 is a communication unit for each wide-area communications system with which communications are desired. Three or more slots 215, 217, and 219 are provided in the RF section 203 of the briefcase 101 in which a communication unit is plugged in, one unit per slot. If an example briefcase system includes paging, cellular phone service, and data service, a pager unit, cellular phone unit, and data terminal unit would be plugged into the slots 215, 217, and 219. These units include the appropriate RF and modulation hardware for the particular system. No peripheral hardware, such as microphones, speakers, antennas, and so forth, is included in these units. Each unit has the same electrical and physical interface to the briefcase 101, although the unit may not use the entire interface, such as a pager not requiring audio output. This gives each slot the flexibility of being used for any wide-area communication unit, without requiring a particular slot for a certain unit. The briefcase 101 has a microphone 311 and a speaker 313 in FIG. 3 shared by each communication unit. A conventional telephone jack 221 is also provided for interface to the Public Switched Telephone Network.

Figure 3:
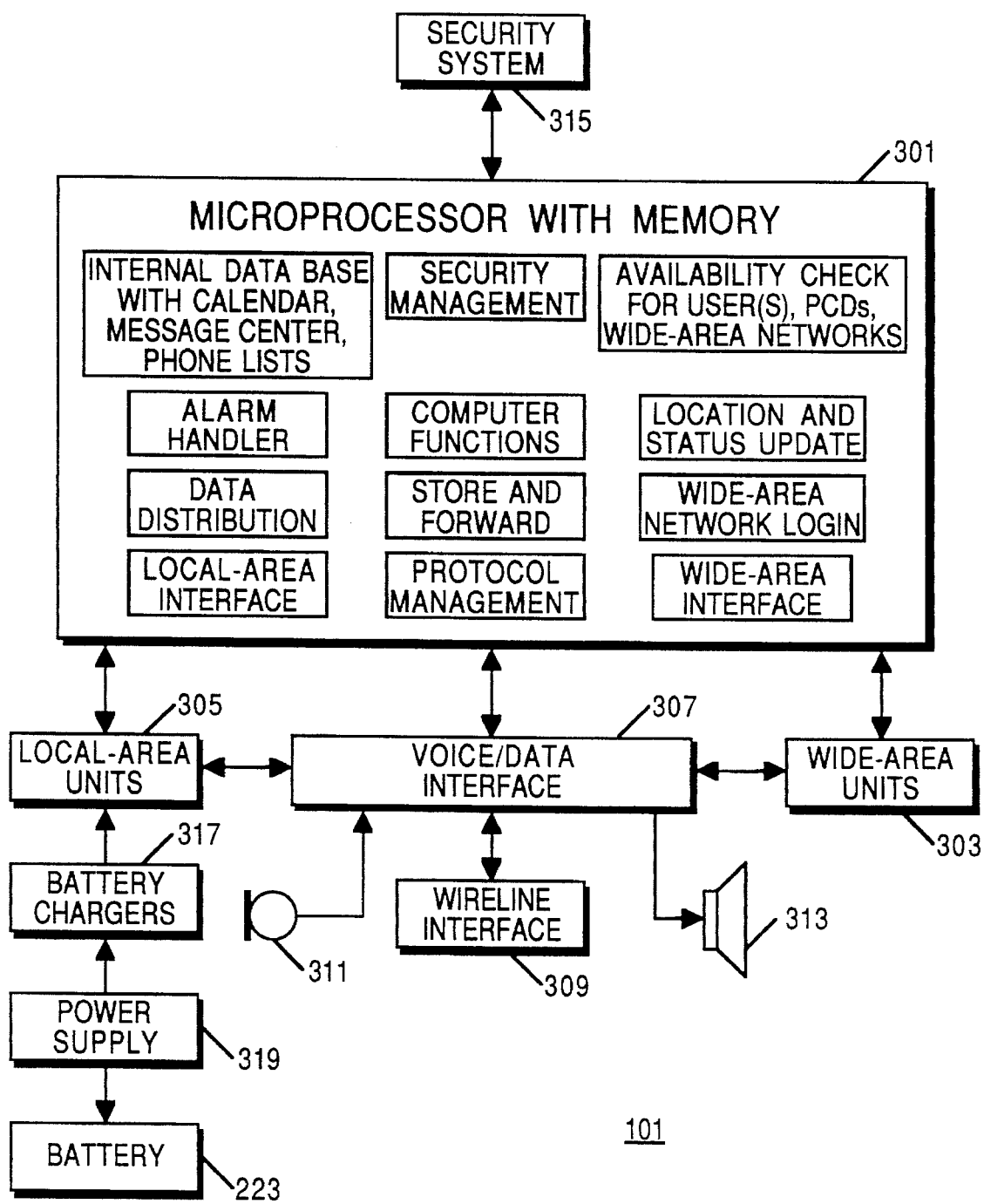
FIG. 3 is a block diagram of a briefcase with integrated communications control in accordance with the invention.

A large-capacity, rechargeable battery 223 is stored in compartment 225 in the RF section 203 of the briefcase 101. A retractable power cord 227 provides standard power to a power supply (not shown) that charges the battery 223 and provides power to the briefcase 101, including wide-area communication units in the slots 215, 217, and 219, the battery chargers (not shown) for the PCDs, and the interface hardware as shown in FIG. 3. The briefcase 101 is powered by the rechargeable battery 223 when the power cord 227 is not plugged into a live power outlet.

An antenna 229 for local-area communications is hidden within one side of the storage section 201 of the briefcase 101. An antenna 231 for wide-area communications is hidden within the other side of the storage section 201 of the briefcase 101. A heat sink 233 for the wide-area communication units is distributed along one side of the RF section 203 of the briefcase 101 such that the heat sink 233 also serves as a support for the briefcase 101 when the briefcase 101 stands vertically on that side.

A security system is included to prevent unauthorized entry into the briefcase 101. The briefcase locks 235 and 237 include standard key locks, combination locks, and thumbprint scanner locks depending on the security desired by the owner of the briefcase 101. Easy access can also be provided by a simple security card 239 access system. The security card 239 system grants multiple users access to any of the communications media of the briefcase 101, with limited access as desired by the owner.

A block diagram of a briefcase with integrated communications control is shown in FIG. 3. The communications devices within the briefcase 101 are integrated by a microprocessor with memory 301 (microprocessor), such as one of the 68000 family of microprocessors available from Motorola, Inc. Basic control functions for the briefcase 101 are provided by microprocessor 301, which may also supply significant computing ability to the user, as a personal computer would provide. The microprocessor 301 maintains many internal databases and functions. The internal data base includes an electronic calendar, a message center, and phone lists. Some functions provided by the microprocessor 301 include an alarm handler, data distribution, local-area interface, security management, computer functions, store and forward of messages, protocol management, availability check for user(s), PCDs, and wide-area networks, location and status update as well as login to wide-area networks, and wide-area interface.

The wide-area communication units 303 are connected to the microprocessor 301, enabling control for transmission and reception of messages from wide-area systems. The wide-area units are also connected to a voice/data interface 307, which provides any necessary voice and data interface for the wide-area units to the microprocessor 301 and the microphone 311 and speaker 313 for the briefcase 101. The voice/data interface 307 provides voice and data interfaces, which includes protocol interfaces for data/text, voice/audio, graphics/images, video, and telemetry, and others as appropriate to the wide-area system.

A local-area communication unit (or units) 305 is connected to the microprocessor 301, enabling control for transmission and reception of messages from the PCDs. The local-area unit 305 is capable of transmitting and receiving the various communication protocols of the PCDs, including voice, data, and video communications. The local-area unit 305 is also connected to the voice/data interface 307, which provides any necessary voice and data interface for the local-area units to the microprocessor 301 and the microphone 311 and speaker 313 for the briefcase 101.

The voice/data interface 307, as commanded by the microprocessor 301, controls which communication units have current access to the microphone 311 and speaker 313 or the PCDs. The voice/data interface 307 converts data from the wide-area units 303 to the format necessary for local-area communications, and converts the data from local-area communications to the format required by each wide-area unit 303. A wireline interface 309 is also connected to the voice/data interface 307, which provides conversion between the wireline protocol and the local-area communication protocol.

A power supply 319, energized by standard AC power via power cord 227 of FIG. 2, provides power to the battery chargers 317 for the local-area units 305. The power supply 319 also charges a large-capacity, rechargeable battery 223. When the power supply 319 is plugged into a live power outlet, the power supply 319 provides power to run the briefcase 101. When the power supply 319 is not plugged into a live power outlet, the battery 223 provides power to run the briefcase 101.

The microprocessor 301 provides communications management for the user by reacting to instructions from the user as well as from the wide-area and local-area devices. The microprocessor 301 maintains security of the resources of the briefcase 101 with a security system 315, including physical entry locks 235 and 237, a security card 239 access system, resource authorization through unit identification, encryption of transmissions, and other security functions.

Figure 4:
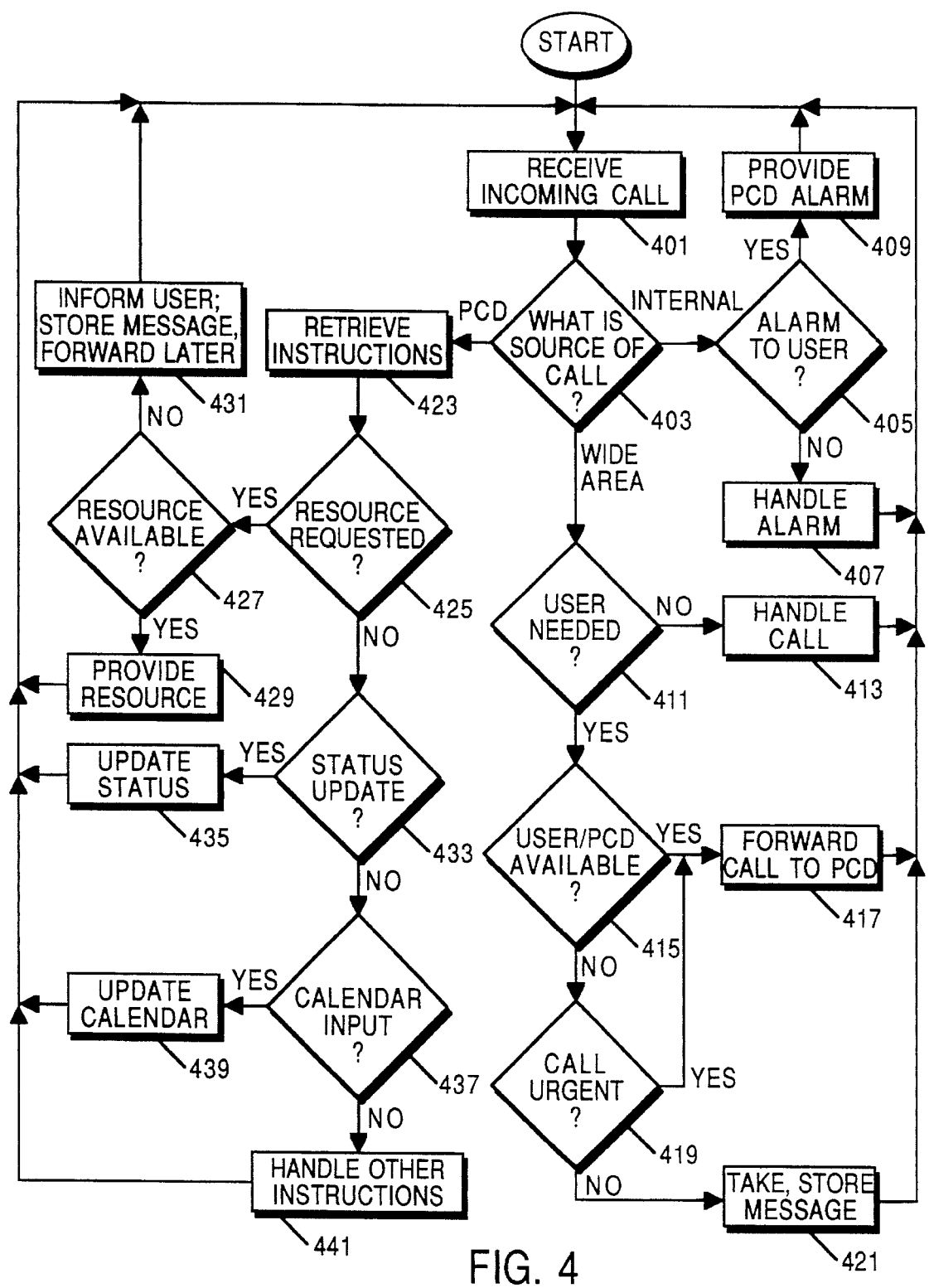
FIG. 4 is a flowchart showing integrated communications control in accordance with the invention.

A flowchart showing integrated communications control appears in FIG. 4. The steps of the flowchart are performed by the microprocessor 301. When an incoming call is received at step 401, the microprocessor 301 determines what the source of the call is at step 403. If the source of the call is internal with respect to the briefcase 101, the process continues with step 405. An internal data base is maintained by the microprocessor 301 and contains a calendar and clock in which the user can store alarms for reminders of events such as meetings or deadlines. The security system 315 and battery 223 also send internal alarms, such as intruder alert or low power, respectively. Other internal alarms include software maintenance reminders and out of range indications for either the local-area or wide-area units. If the alarm is directed to the user at step 405, the alarm is provided to the appropriate PCD at step 409, and the process continues with step 401. If the alarm is not directed to the user at step 405, the alarm is handled appropriately by the microprocessor 301 at step 407, and the process continues with step 401.

If the source of the call at step 403 is a wide-area communication unit, the process continues with step 411. If the user is not needed to handle the call at step 411, the microprocessor 301 handles the call appropriately at step 413. If the user is needed to handle the call at step 411, and the user and PCD are available (in range and functional in the case of the PCD) to handle the call at step 415, the call is forwarded (relayed) to the appropriate PCD at step 4 17, whereby the local-area unit 305 transmits the call to the PCD, and the process continues with step 401. If the user is not available at stop 415, but the call is urgent at stop 419, the call is relayed to the appropriate PCD at step 417, and the process continues with step 401. If the call is not urgent at stop 419, the microprocessor 301 takes and stores a message at step 421 for future reference by the user, and the process continues with stop 401.

If the source of the call at step 403 is a PCD, i.e., the user, the microprocessor 301 retrieves instructions from the call at step 423. If a wide-area communication resource is requested by the user at stop 425, and the resource is available at step 427, i.e., the briefcase 101 is in range of the resource which is currently in service, the resource is provided at step 429. For example, a cellular phone call may be requested. The handset 105 output is converted to the proper format and coupled to the cellular phone, in slot 215 in this example, by the microprocessor 301 and voice/data interface 307. With this function, the most economical available resource may be sought out. The microprocessor 301 provides the proper dialling sequence for the phone number, which may be supplied by the user or retrieved from a phone list in the internal data base within the memory for the microprocessor 301. If the resource is not available at stop 427, the user is informed at step 431, and if desired and appropriate, the briefcase 101 takes and stores a message, which can be forwarded at a later time, or the requested call can be placed by the briefcase 101, when the resource becomes available.

If the user requests a status update at step 433, the status, such as whether the user wishes to be disturbed or not for specific types of calls, is updated at step 435. The microprocessor 301 informs the user of any waiting messages as well. If the user enters a calendar input at step 437, the microprocessor updates the calendar at step 439, and the process continues with step 401. At step 441, the microprocessor 301 handles any other instructions appropriately. These instructions may include retrieving possible airline flights, rental cars, and hotel rooms with costs for a future business trip. The computer calls up a reservations computer with the appropriate wide-area communication unit to find the relevant data and relays the availability and cost for each flight to the user via the notepad 107. The user may subsequently request that reservations be made for a specific flight, which the briefcase 101 then calls in and books. The microprocessor 301 may also provide temporary storage of a file, or may forward a file to a fixed data base or retrieve another file for local use.

The briefcase communications system performs as a personal communications agent, through which a user receives complete communications coverage. Portability permits extensive travel while putting vast amounts of information and communications resources at the user's fingertips. As few as two PCDs eliminate the need to carry numerous wide-area devices and to maintain as many different batteries and battery chargers. A personal calendar with alarms, message taking capacity, and various other user aids handle the individual communications needs of the user. The system uses a standardized but flexible user-friendly interface.

Although a briefcase was chosen as the housing for this portable communications system, the housing may take on many shapes or sizes without loss of functionality. For example, it may be desired to own multiple units and to leave one at home, keep one at the office, and travel with the briefcase. The home or office units may be installed in a small file cabinet, book case, or foot stool. In place of a briefcase, the system may be installed in a toolbox, lunch box, or even a violin case.

What is claimed is:

1. A communication system, comprising:

a portable housing;

a local-area wireless communication unit, disposed in said portable housing, including a transceiver constructed and arranged to communicate with a plurality of local-area wireless personal communication devices, wherein at least some of said personal communication devices are different from one another;

a wide-area communication unit, disposed in said portable housing, including a transceiver to communicate with at least one wide-area communication system; control means, disposed in said portable housing for selectively controlling said local-area wireless communication unit and said wide-area communication unit;

means, disposed in said portable housing, for storing a communication when a wide-area communication system is not available to said wide-area communication unit; and means for forwarding said communication when said wide-area communication system becomes available to said wide-area communication unit.

2. The system of claim 1, further comprising means for interfacing communications from said at least one wide-area communication system to at least one of said plurality of personal communication devices, wherein said interfacing is transparent to a user.

3. The system of claim 1, wherein said at least some of said personal communication devices differ from one another in that at least two of said at least some of said personal communication devices utilize different communication protocols.

4. The system of claim 1, wherein at least one of said plurality of personal communication devices is a measurement instrument.

5. The system of claim 1, further comprising means for providing internal alarms to at least one of said plurality of personal communication devices.

6. The system of claim 1, wherein said local-area wireless communication unit is further supported by a wireline connection.

7. The system of claim 1, wherein said wide-area wireless communication unit is further supported by a wireline connection.

8. The system of claim 1, further comprising means for supporting multiple communication protocols.

9. The system of claim 1, further comprising means for supporting multiple information formats.

10. The system of claim 1, further comprising:

means for interfacing to said control means a first wide-area communication unit from a first wide-area communication system; and means for interfacing to said control means a second wide-area communication unit from a second wide-area communication system, wherein said means for interfacing said first wide-area communication unit and said means for interfacing said second wide-area communication unit provide the same electrical and physical interface.

11. The system of claim 1, further comprising:

means for receiving a wide-area communication;

means, coupled to said means for receiving, for converting said wide-area communication to a local-area communication; and means, coupled to said means for converting, for forwarding said local-area communication to an appropriate local-area communication unit.

12. The system of claim 1, further comprising:

means for storing a communication when a personal communication device is not available; and means for forwarding said communication when said personal communication device becomes available.

13. The system of claim 1, further comprising means for updating status and location with said wide-area communication system and logging into said wide-area communication system.

14. The system of claim 1, further comprising means for providing authorized entry and preventing unauthorized entry into said portable housing.

15. The system of claim 1, further comprising means for granting access to communication resources supported within said portable housing.

16. The system of claim 1, further comprising means for enabling multiple users the ability to access said portable housing.

17. The system of claim 1, further comprising means for distributing data to a computer external to the portable housing.

18. The system of claim 1, further comprising means for supplying computing ability within the portable housing.

19. The system of claim 1, further comprising:

means for entering an event with a date in as electronic calendar; and means for providing an alarm of said event from said calendar when said date occurs.

20. A communication system, comprising:

a portable housing;

a local-area wireless communication unit, disposed in said portable housing, including a transceiver constructed and arranged to communicate with a plurality of local-area wireless personal communication devices, wherein at least some of said personal communication devices are different from one another;

a wide-area communication unit, disposed in said portable housing, including a transceiver to communicate with at least one wide-area communication system;

means, disposed in said portable housing, for receiving a wide-area communication;

means, coupled to said means for receiving, for converting said wide-area communication to a local-area communication;

means, coupled to said means for converting, for forwarding said local-area communication to an appropriate local-area communication unit;

means, disposed in said portable housing for storing a communication when a wide-area communication system is not available to said wide-area communication unit; and means for forwarding said communication when said wide-area communication system becomes available to said wide-area communication unit.

21. The system of claim 20, wherein said local-area wireless communication unit is further supported by a wireline connection.

22. The system of claim 20, wherein said wide-area wireless communication unit is further supported by a wireline connection.

23. The system of claim 20, further comprising means for supporting multiple communication protocols.

24. The system of claim 20, further comprising:

means for interfacing to a first wide-area communication unit from a first wide-area communication system; and means for interfacing to a second wide-area communication unit from a second wide-area communication system, wherein said means for interfacing said first wide-area communication unit and said means for interfacing said second wide-area communication unit provide the same electrical and physical interface.

25. The system of claim 20, further comprising:

means for storing a communication when a personal communication device is not available; and means for forwarding said communication when said personal communication device becomes available.

26. The system of claim 20, further comprising means for updating status and location with said wide-area communication system and logging into said wide-area communication system.

27. The system of claim 20, further comprising means for distributing data to a computer external to the portable housing.

28. A communication system, comprising:

a portable housing;

a local-area wireless communication unit disposed in said portable housing including a transceiver to communicate with a plurality of local-area wireless personal communication devices, wherein at least some of said personal communication devices are different from one another;

a wide-area communication unit disposed in said portable housing including a transceiver to communicate with at least one wide-area communication system;

means, disposed in said portable housing, for receiving a wide-area communication;

means, coupled to said means for receiving, for converting said wide-area communication to a local-area communication;

means, coupled to said means for converting, for forwarding said local-area communication to an appropriate local-area communication unit;

means, operatively coupled to said portable housing, for interfacing to a first wide-area communication unit from a first wide-area communication system;

means, operatively coupled to said portable housing, for interfacing to a second wide-area communication unit from a second wide-area communication system, wherein said means for interfacing said first wide-area communication unit and said means for interfacing said second wide-area communication unit provide the same electrical and physical interface;

means, disposed in said portable housing, for storing a communication when a wide-area communication system is not available to said wide-area communication unit; and means for forwarding said communication when said wide-area communication system becomes available to said wide-area communication unit.

29. The system of claim 28, wherein said local-area wireless communication unit is further supported by a wireline connection.

30. The system of claim 28, wherein said wide-area wireless communication unit is further supported by a wireline connection.

31. The system of claim 28, further comprising means for supporting multiple communication protocols.

32. The system of claim 28, further comprising:

means for storing a communication when a personal communication device is not available; and means for forwarding said communication when said personal communication device becomes available.

33. The system of claim 28, further comprising means for updating status and location with said wide-area communication system and logging into said wide-area communication system.

34. The system of claim 28, further comprising means for distributing data to a computer external to the portable housing.

35. A communication system, comprising:

a portable housing;

a local-area wireless communication unit disposed in the portable housing including a transceiver to communicate with a plurality of local-area wireless personal communication devices, wherein at least some of the personal communication devices are different from one another;

a wide-area communication unit disposed in the portable housing including a transceiver to communicate with at least one wide-area communication system;

control means disposed in the portable housing for selectively controlling the local-area wireless communication unit and the wide-area communication unit;

means, disposed in the portable housing, for storing a communication when a wide-area communication system is not available to the wide-area communication unit; and means for forwarding the communication when the wide-area communication system becomes available to the wide-area communication unit.

36. The system of claim 1, further comprising:

means for distributing data to a computer external to the portable housing; and means for receiving data from a computer external to the portable housing.

37. The system of claim 1, further comprising a microprocessor that supplies computing ability within the portable housing.

* * * * *